Jan. 18, 1938. B. DICK 2,105,880
TRAILER OR TRUCK BRAKING MECHANISM
Original Filed Oct. 9, 1935 2 Sheets-Sheet 1

INVENTOR.
BURNS DICK
BY
ATTORNEY.

Jan. 18, 1938.  B. DICK  2,105,880
TRAILER OR TRUCK BRAKING MECHANISM
Original Filed Oct. 9, 1935  2 Sheets-Sheet 2
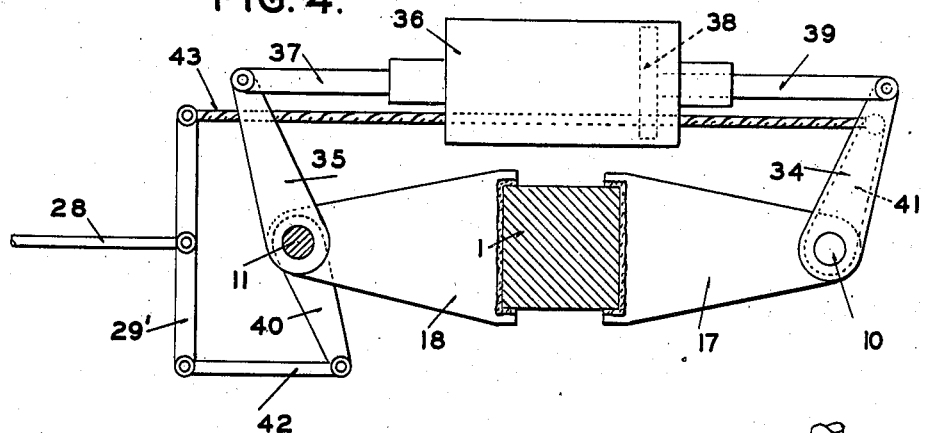
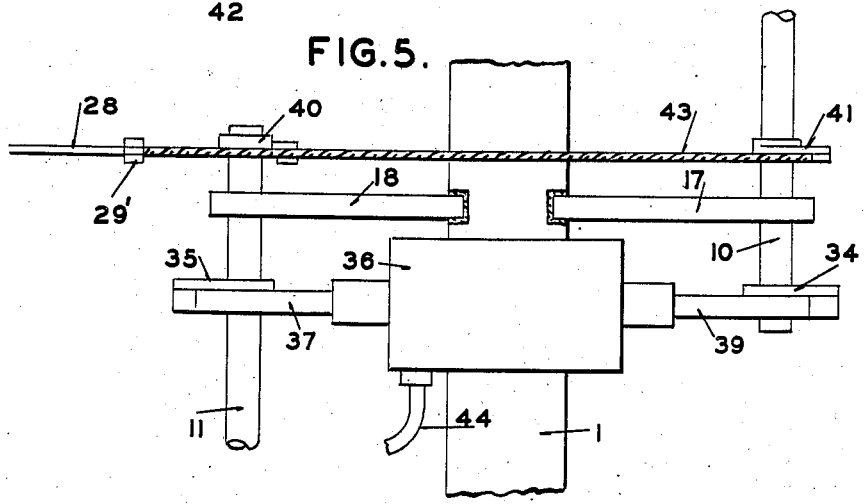
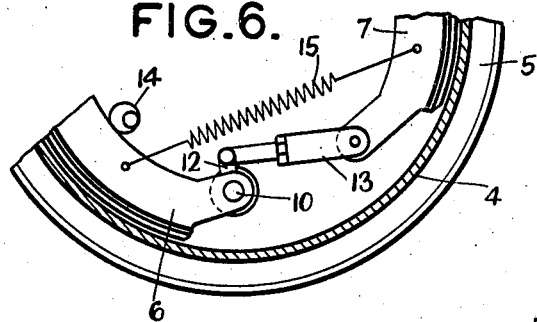
INVENTOR.
BURNS DICK
BY
ATTORNEY.

Patented Jan. 18, 1938

2,105,880

UNITED STATES PATENT OFFICE 2,105,880

TRAILER OR TRUCK BRAKING MECHANISM

Burns Dick, Ferguson, Mo., assignor to Wagner Electric Corporation, St. Louis, Mo., a corporation of Delaware Application October 9, 1935, Serial No. 44,146
Renewed December 2, 1937

6 Claims. (Cl. 188—106)

My invention relates to braking mechanism and more particularly to brake actuating mechanism to be combined with and mounted on the axle of a vehicle such as a trailer or a truck.

One of the objects of my invention is to provide a braking system which may be readily and economically installed on a trailer or truck either in the field or as original equipment.

Another object of my invention is to provide a simple and efficient brake actuating mechanism for applying a pair of brakes with equal pressure, which mechanism is carried by the vehicle axle and operable either by a fluid motor or by a mechanically operated rod.

Figure 1:
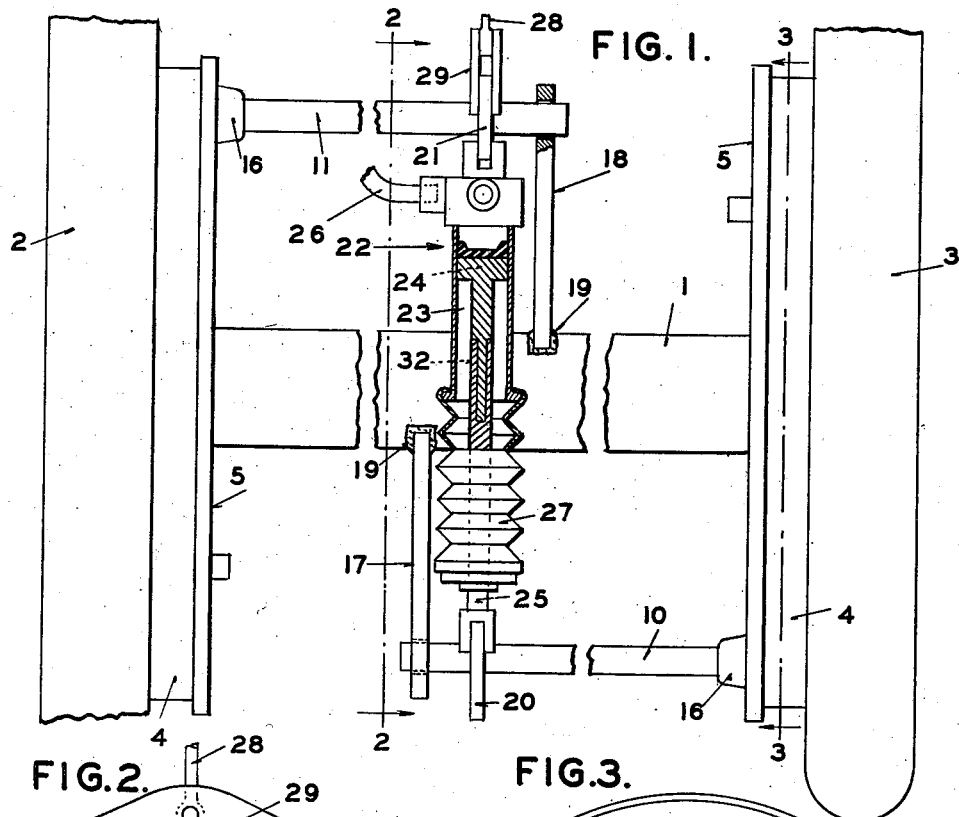
Figure 2:
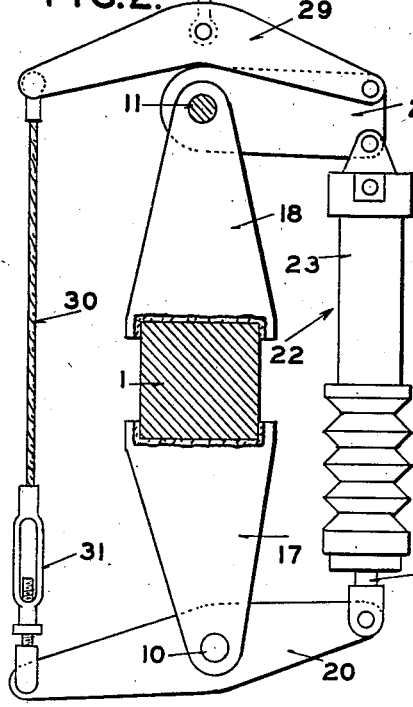
Figure 3:
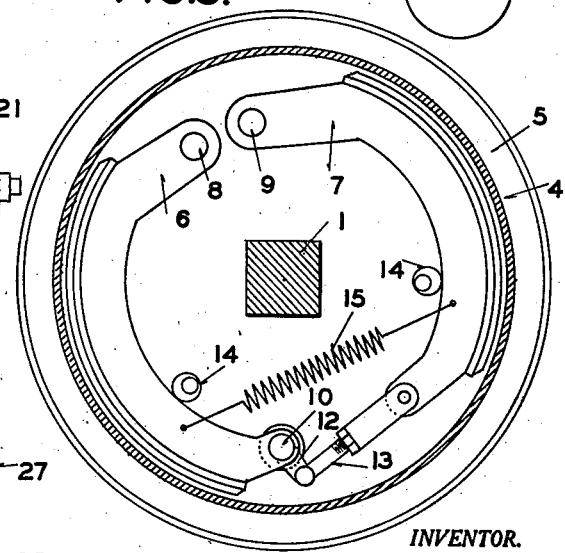

Other objects of my invention will become apparent from the following description taken in connection with the accompanying drawings in which Figure 1 is a top view of my improved braking system employing a fluid motor and as installed on a trailer having a dead axle; Figure 2 is a cross-sectional view on the line 2—2 of Figure 1, showing one of the brakes; Figure 3 is a cross-sectional view on the line 3—3 of Figure 1, showing the fluid motor and the mechanical actuating mechanism; Figures 4 and 5 are views showing a modified form in which a vacuum motor is employed in place of a fluid pressure motor; and Figure 6 shows the arrangement of the brake expanding device to be employed with the structure of Figures 4 and 5.

Referring to Figures 1 to 3 in detail, the dead axle 1 of the trailer upon which my novel brake actuating mechanism is mounted is of square cross-section and carries at each end wheels 2 and 3. Each of these wheels has secured thereto a brake drum 4, the open side of which is closed by means of the usual dust plate or backing plate 5 suitably secured to the axle 1.

The brake shoes which are carried by the backing plate and cooperate with the drum are of the same construction for each wheel, the one for the wheel 3 being shown in detail in Figure 3. Each brake is of the two-shoe expanding type and comprises shoes 6 and 7 in end to end relation. One pair of adjacent ends of the shoes are pivotally mounted to the backing plate by means of fixed anchor pins 8 and 9, and the other pair of adjacent ends are expanded by means of a rotatable shaft and linkage construction. The shaft for actuating the brake upon the wheel 3 is designated by the numeral 10, and the shaft for actuating the brake upon the wheel 2 is designated by the numeral 11. Referring to Figure 3, the shaft 10 is rotatably mounted in the end of the brake shoe 6 and has rigidly secured thereto adjacent to the brake shoe end an arm 12. The free end of this arm is pivotally connected by an adjustable link 13 with the adjacent end of the shoe 7. The shaft 10 has no bearing in the backing plate since the opening through which it extends is of larger diameter than the diameter of the shaft, thus permitting the shaft to have relative lateral movement. The brake shoes are normally maintained in their retractive position against the stops 14 by means of the usual retracting spring 15. A boot 16 prevents dirt, water and other foreign material from entering the brake drum through the backing plate opening receiving the shaft 10.

The actuating shafts 10 and 11 for the brakes of the wheels 3 and 2 are positioned upon opposite sides of the trailer to permit proper operation by the actuating mechanism to be described. The central portion of the axle has secured thereto oppositely extending and laterally spaced brackets or arms 17 and 18, the arm 17 forming a support and bearing for the inner end of the brake actuating shaft 10, and the arm 18 forming a support and bearing for the inner end of the brake actuating shaft 11. The respective bearings for the shafts 10 and 11 are so constructed as to permit the shafts to have a slight lateral play therein so that the brake actuating ends of the shafts may have the desired lateral movement to properly apply the brakes. Since the shafts are of considerable length and the lateral movement of the brake end of each shaft necessary to apply the brake is very small, this lateral play of the shafts in their bearings need not be much more than the usual play in an ordinary bearing. The arms 17 and 18 may be secured to the axle in any suitable manner, as for example by means of welds 19, as shown.

The actuating shaft 10 has secured thereto a double-arm lever 20, and the shaft 11 has secured thereto an upwardly extending arm 21. These arms are adapted to be rotated in opposite directions by means of either a fluid motor or a mechanically actuated pull-rod. The fluid motor 22 has its cylinder 23 directly pivoted to the end of the arm 21 and its piston 24 directly pivoted to the upper end of the double-arm lever 20 by means of the piston rod 25. Fluid under pressure for actuating the fluid motor is supplied to the cylinder from a suitable source by means of a conduit 26. A suitable collapsible boot 27 prevents dust and other foreign material from entering the fluid motor.

The mechanical linkage for rotating the brake actuating shafts 10 and 11 in opposite directions comprises a manually-actuated pull-rod 28 pivotally connected to the central portion of a floating lever 29. One end of this lever is directly connected to the arm 21 on the shaft 11, and the other end is connected to the lower arm of the lever 20 by means of a flexible member 30. A turnbuckle 31 is provided in this flexible member for adjustable purposes.

In the operation of my improved brake actuating mechanism, when it is desired to apply the brakes by means of the fluid motor, fluid under pressure is conveyed to the cylinder 23 through the conduit 26, thus moving the cylinder and piston in opposite directions, and as a result thereof rotating the brake actuating shafts 10 and 11 in opposite directions. The rotation of these shafts results in the brake shoes 6 and 7 of both brakes being expanded into engagement with the drum by means of the arm 12 and connecting link 13. During actuation of the brake by means of the fluid motor, the pull-rod 28 will not be affected since the flexible connecting element 30 permits the lower arm of the lever 20 to move independently of the floating lever 29.

When it is desired to actuate the brakes by means of the pull-rod 28 movement of this rod to the left will result in the shaft 11 being rotated by means of the arm 21 and the shaft 10 rotated by means of the flexible element 30 and the lower arm of the lever 20. Since this mechanism results in the same direction of rotation of the shafts 10 and 11 as is caused by operation of the fluid motor, the brakes will be applied in the same manner as just described. In order to prevent movement of the fluid motor piston during actuation of the brakes by the pull-rod, the piston rod 25 is made in two telescopic sections as shown at 32 (Figure 1).

My novel brake actuating mechanism insures that both brakes will be applied with an equal pressure. When the fluid motor is employed the rotating force upon each of the shafts 10 and 11 is the same, since the arm 21 and the upper end of the arm of the lever 20 are of the same length and the motor is floatingly connected between the ends of these arms. The actuating mechanism for expanding each of the brakes also insures that the brake shoes will be applied to the drum with an equal force since the end of the actuating shaft is pivotally mounted in the end of one brake shoe and the arm 12 thereon is directly connected to the end of the other shoe by a floating link. When the mechanical actuating mechanism is used the floating lever 29 insures equalization of the braking pressure.

The entire actuating mechanism may be readily installed upon existing trailers, trucks, or other vehicles which are not originally equipped with brakes. In addition to mounting the braking mechanism upon the wheels, all that is necessary to mount the actuating mechanism is to weld the two arms 17 and 18 to the dead axle 1.

Referring to Figures 4 and 5, I have shown a modification of the structure previously described whereby the actuation of the shafts 10 and 11 may be performed by means of a suction motor instead of a fluid pressure motor. In this embodiment the brackets or arms 17 and 18 are mounted in alignment on opposite sides of the axle 1. The shaft 10 has secured thereto an upstanding arm 34, and shaft 11 has secured thereto an upstanding arm 35. The cylinder 36 of the vacuum motor is pivotally connected to the arm 35 by means of a rod 37 and the piston 38 of the motor has its piston rod 39 pivotally connected to the arm 34. The shaft 11 also has secured thereto a downwardly extending arm 40 and the shaft 10 an upwardly extending arm 41. The arm 40 is connected to one end of the pull-rod lever 29' by means of a rod 42 and the arm 41 is connected to the other end of the pull-rod lever by means of a flexible member 43. The pull-rod lever is actuated by pull-rod 28 in the same manner as in the previously described embodiment.

The vacuum motor is connected by conduit 44 to a source of suction that is suitably controlled. When the air in the vacuum motor is removed through the conduit atmospheric pressure will operate the suction motor, resulting in the shafts 10 and 11 being rotated in opposite directions, thereby applying the brakes in the manner previously described. When the pull-rod 28 is actuated the linkage construction shown will also rotate the shafts 10 and 11 in the same direction as the suction motor rotates them to thereby apply the brakes.

In the modification shown in Figures 4 and 5, the shafts 10 and 11 when actuated are rotated in directions opposite to that in which they are rotated in the embodiment shown in Figure 1. In order to take care of this opposite direction of rotation of these shafts and properly apply the brakes, the arm 12 of the brake expanding linkage is placed upon the opposite side of the shafts 10 and 11, as shown in Figure 6, so that the link 13 may be moved in the proper direction.

Having fully described my invention, what I claim as new and desire to secure by Letters Patent of the United States is:

1. In braking mechanism, the combination of a dead axle of a vehicle, a wheel at each end thereof, a brake for each wheel and comprising a drum and a cooperating friction device, supporting brackets secured to the central part of the axle and positioned on opposite sides thereof, shafts positioned on opposite sides of the axle, one end of each shaft being journaled in a bracket and the other end being supported by and connected to actuate the friction device of one of the brakes, an arm mounted on each shaft adjacent the first named end, a fluid motor interposed between and connected to the arms to rotate the shafts in opposite directions to actuate the friction devices, independently operable means for rotating said shafts, said last named means comprising a pull-rod, and an equalizing lever connected at its center to the pull-rod and at its ends to the arms secured to the shafts.

2. In braking mechanism, the combination of an axle having a wheel at one end, a brake drum on the wheel, a friction device for engaging the drum and provided with a pair of adjacent expansible ends, a rotatable shaft having one end pivotally carried by one end of the friction device, an arm secured to the last named end of the shaft, a rod pivoted to said arm and operatively connected to the other end of the friction device, means for rotatably supporting the other end of the shaft from the axle, an arm on said shaft adjacent the axle support, and a fluid motor connected to said last named arm for rotating the shaft to thereby expand the friction device.

3. In braking mechanism, the combination of a vehicle axle, a wheel at each end thereof, a brake for each wheel, two rotatable shafts each connected to operate a brake, said shafts extending inwardly from the brakes and having their axes substantially parallel, means for supporting the inner ends of the shafts from the axle, means for supporting the outer end of each shaft on the brake it is adapted to actuate, a floating lever, connections between one end of said lever and one shaft and the other end of said lever and the other shaft, said connections between the ends of the floating lever and the shafts comprising arms secured to the shafts and extending in opposite directions, and an actuating rod connected to the central portion of said floating lever.

4. In braking mechanism, the combination of a vehicle axle, a wheel at each end thereof, a brake for each wheel, two rotatable shafts each connected to operate a brake, said shafts extending inwardly from the brakes and having their axes substantially parallel, means for supporting the inner ends of the shafts from the axle, an arm on each shaft, a floating fluid motor connected between the arms for rotating the shafts to actuate the brakes, and independently operable means for rotating said shafts simultaneously, said last named means comprising a pull-rod, a floating lever having its central portion connected to the pull-rod, an arm on one shaft connected to one end of the lever, and an arm on the other shaft connected to the other end of the lever, said arms extending in opposite directions from the shafts.

5. In braking mechanism, the combination of a vehicle axle, a wheel at each end thereof, a brake for each wheel comprising a rotatable drum and a cooperating friction means, means including a rotatable shaft for actuating the friction means of each brake into engagement with its drum, said shafts extending inwardly from the brakes and having their axes substantially parallel with the axle, means for supporting the inner end of each shaft on the axle, fluid pressure means for simultaneously rotating the shafts, an arm secured to the inner end of each shaft, a floating lever, a connection between one end of said lever and the arm on one of the shafts, a connection between the other end of said lever and the arm on the other shaft, and an actuating rod connected to the central portion of said floating lever.

6. In braking mechanism, the combination of a vehicle axle, a wheel at each end thereof, a brake for each wheel comprising a rotatable drum and a cooperating friction means, means including a rotatable shaft for actuating the friction means of each brake into engagement with its drum, said shafts extending inwardly from the brakes and having their axes substantially parallel with the axle, means for supporting the inner end of each shaft on the axle, means for supporting the outer end of each shaft on the friction means of the brake which it is adapted to actuate, fluid pressure means for simultaneously rotating the shafts, an arm secured to the inner end of each shaft, said arms extending in opposite directions, a floating lever, a connection between one end of said lever and the arm on one of the shafts, a connection between the other end of said lever and the arm on the other shaft, and an actuating rod connected to the central portion of said floating lever.

BURNS DICK.